United States Patent
Rowstron et al.

(10) Patent No.: US 6,751,619 B1
(45) Date of Patent: Jun. 15, 2004

(54) METHODS AND APPARATUS FOR TUPLE MANAGEMENT IN DATA PROCESSING SYSTEM

(75) Inventors: Antony Ian Taylor Rowstron, Cambridge (GB); Rocco De Nicola, Pisa (IT)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/526,640

(22) Filed: Mar. 15, 2000

(51) Int. Cl.$^7$ .......................... G06F 17/30; G06F 15/16
(52) U.S. Cl. .............................. 707/10; 707/3; 709/203
(58) Field of Search ................. 707/1–5, 10, 101–104, 707/6; 706/48–50; 711/108; 709/203, 228, 217; 718/101

(56) References Cited

U.S. PATENT DOCUMENTS

| | | | |
|---|---|---|---|
| 5,615,309 A | * 3/1997 | Bezek et al. | 706/50 |
| 5,963,947 A | * 10/1999 | Ford et al. | 707/10 |
| 5,974,420 A | * 10/1999 | Lehman et al. | 707/101 |
| 5,974,427 A | 10/1999 | Reiter | 707/203 |

OTHER PUBLICATIONS

"JavaSpaces Specification", *JINI*, Sun Microsystems, Version 1.0.1, 1–24, (Nov. 1999).
Butcher, P., et al., "Global Synchronisation in Linda", *Concurrency: Practice and Experience*, Department of Computer Science; University of York; 6(6), 505–516, (1994).
Carreira, J., et al., "On the Design of Eilean: A Linda–Like Library for MPI", *Technical Report*, Universidade de Coimbra, 9 pages, (1994).
Carriero, N., et al., "A Foundation for Advanced Compile–time Analysis of Linda Programs", *LNCS 589; Language and Computers for Parallel Computing*, Yale University, 390–404, (1991).
Carriero, N., et al., "Linda in Context", *Communications of the ACM*, Artificial Intelligence and Language Processing; vol. 32(4), 444–458, (Apr. 1989).
Carriero, N., et al., "Tuple Analysis and Partial Evaluation Strategies in the Linda Precompiler", *Languages and Compilers for Parallel Computer*, Research Monographs in Parallel and Distributed Computing, MIT Press, 114–125, (1990).
Ciancarini, P., et al., "Coordinating Java agents over the WWW", *World Wide Web Journal*, 1(2), 87–99, (1998).

(List continued on next page.)

Primary Examiner—Uyen Le
Assistant Examiner—Te Yu Chen
(74) Attorney, Agent, or Firm—Amin & Turocy, LLP

(57) ABSTRACT

A data processing system stores information in tuple space as tuples that are accessible by multiple entities. Methods, apparatus, computer-readable media, and data structures provide efficient extensions to tuple space coordination languages for example Linda, that increase concurrency by lessening tuple removal, without requiring compile time analysis, altering existing primitives, or adding new primitives. Traces are used to analyze tuple space access in distributed systems, resulting in optimizations based upon certain conditions which, if met, enable a tuple to remain visible in tuple space without blocking, so that other processes can continue to read the tuple while a first process is updating the tuple. A run-time optimization modifies the conditions if the execution is in a closed system that is known not to intentionally contain deadlock, further improving performance.

44 Claims, 8 Drawing Sheets

OTHER PUBLICATIONS

Ciancarini, P., et al., "Coordinating Multiagent Applications on the WWW: A Reference Architecture", *IEEE Transactions on Software Engineering*, 24(5), 362–366, (1998).

Ciancarini, P., et al., "Coordination Technologies for Internet Agents", *To Appeal Nordic Journal of Computing*, 1–24, (1999).

De Nicola, R., et al., "KLAIM: A Kernel Language for Agents Interaction and Mobility", *IEEE Transactions on Software Engineering*, vol. 24, No. 5, 315–330, (May 1998).

Omicini, A., et al., "Tuple Centres for the Coordination of Internet Agents", *To appeal Autonomous Agents and Multi-agent Systems*, Special Issue on Coordination Mechanisms and Patterns for Web Agents, 1–8, (1999).

Picco, G.P., et al., "LIME: Linda Meets Mobility", *Technical Report—Technical Report WUCS 98–21*, Washington University, Department of Computer Science, St. Louis Missouri, 10 pages, (1998).

Rowston, A., "WCL: A Co-ordination Language for Geographically Distributed", *World Wide Web Journal*, 1(3), 167–179, (1998).

Rowstron, A., "Mobile Co-ordination: Providing fault tolerance in tuple space based co-ordination languages", *Coordination99*, vol. 1594 of LNCS, Springer–Verlag, 196–210, (1999).

Rowstron, A., et al., "Bonita: A set of tuple space primitives for distributed coordination", *HICSS–30, IEEE CS Press*, vol. 1, 379–388, (1997).

Rowstron, A., et al., "Solving the Linda multiple rd problem using the copy–collect primitive", *Science of Computer Programming*, Computer Laboratory, University of Cambridge, Department of Computer Science, University of York, 31(2–3), 1–27, (May 6, 1997).

Wyckoff, P., et al., "T Spaces", *IBM Systems Journal*, vol. 37, No. 3, 454–474, (1998).

* cited by examiner

900 ⟶

| DATA STRUCTURE MEMBER | CONTENTS |
|---|---|
| 901 — 1 | PLURALTY OF TUPLES |
| 902 — 2 | LIST OF PRIMITIVES PERFORMED ON THE TUPLES |
| 903 — 3 | EACH PRIMITIVE HAS AN IDENTIFIER FOR AN ENTITY THAT PERFORMED THE PRIMITIVE |
| 904 — 4 | COUNTER FOR EACH ENTITY, THE COUNTER BEING INCREMENTED WHENEVER A PREDETERMINED TYPE OF PRIMITIVE (E.G. AN OUT OR COLLECT) IS PERFORMED BY THE ENTITY |
| 905 — 5 | SET OF CONDITIONS UNDER WHICH A PARTICULAR TUPLE CAN BE KEPT VISIBLE TO A SECOND ENTITY AFTER A FIRST ENTITY HAS PERFORMED A PRIMITIVE ON THE TUPLE:<br><br>(A) THE SECOND PRIMITIVE IS NOT DESTRUCTIVE<br>(B) THE SECOND PRIMITIVE IS NOT BEING PERFORMED BY THE FIRST ENTITY<br>(C) THE FIRST ENTITY HAS NOT SUBSEQUENTLY ACCESSED THE TUPLE SPACE<br>(D) THE SECOND PRIMITIVE BLOCKS A THREAD OF EXECUTION OF THE SECOND ENTITY UNTIL A RESULT IS RETURNED<br>(E) THE FIRST ENTITY HAS NOT TERMINATED |
| 906 — 6 | RUN-TIME SWITCH THAT, IF ENABLED, SUBSTITUTES THE FOLLOWING CONDITIONS FOR CONDITION (C): THE FIRST ENTITY HAS NOT SUBSEQUENTLY INSERTED A TUPLE INTO THE TUPLE SPACE OR CAUSED ANY TUPLES TO BE INSERTED INTO THE TUPLE SPACE |

FIG. 9

METHODS AND APPARATUS FOR TUPLE MANAGEMENT IN DATA PROCESSING SYSTEM

TECHNICAL FIELD

The present invention relates generally to distributed computer systems and, more particularly, to the management of entries in a data structure that are accessible by multiple entities.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999–2000, Microsoft Corporation, and All Rights Reserved.

BACKGROUND OF THE INVENTION

A distributed computer system, such as but not limited to the Internet, is characterized by rapid, real-time interchange among many dissimilar processes executing simultaneously on a large array of dissimilar and geographically diverse processors. A distributed computer system's resources are usually spatially separated, and the execution of its applications often involves multiple execution threads that can be widely separated in time. To address some of the challenges of writing applications for use on distributed computer systems, tuple space based coordination languages were developed.

The first tuple space based coordination language was Linda, a language that was originally developed by Dr. David Gelernter. See, for example, "Linda In Context", N. Carriero and D. Gelernter, Communications of the ACM, 32(4): 444–458, 1989; and N. Carriero and D. Gelernter, "Tuple Analysis and Partial Evaluation Strategies in the Linda Precompiler", in *Languages and Compilers for Parallel Computing, Research Monographs in Parallel and Distributed Computing,* D. Gelernter, A. Nicolau, and D. Padua, editors, MIT Press, 1990, pages 114–125.

A "tuple space" is a globally shared, associatively addressed memory space that is organized as a grouping of tuples. A "tuple" is the basic element of a tuple space system. In the context of a tuple space based coordination language like Linda, a tuple is a vector having fields or values of certain types. In a broader sense, a "tuple" is an entry in an information storage system. For example, a row in a relational database system can be referred to as a tuple.

In Linda-like languages, constructs called "templates" are used to associatively address tuples via matching techniques. A template matches a tuple if they have an equal number of fields and if each template field matches the corresponding tuple field.

Tuple space based coordination languages provide a simple yet powerful mechanism for inter-process communication and synchronization, which is the crux of parallel and distributed programming. A process with data to share generates a tuple and places it into the tuple space. A process requiring data simply requests a tuple from the tuplespace.

Although not quite as efficient as message-passing systems, tuple space programs are typically easier to write and maintain for a number of reasons including the following:

(1) Destination uncoupling (fully anonymous communication)—the creator of a tuple requires no knowledge about the future use of that tuple or its destination.

(2) Spatial uncoupling—because tuples are retrieved using an associative addressing scheme, multiple address-space-disjoint processes can access tuples in the same way.

(3) Temporal uncoupling—tuples have their own life span, independent of the processes that generated them or any processes that may read them. This enables time-disjoint processes to communicate seamlessly.

Research into tuple space systems has proceeded at a steady pace for the past fifteen years, but its focus has been primarily on high-performance parallel computing systems. Recently, interest in tuple space has developed among researchers in distributed systems. For example, SUN Microsystems, Inc. has released as part of the Jini connection technology, a language based on a tuple space based coordination language called Javaspaces, as described in the JavaSpaces Specification, Version 1.0.1, Sun Microsystems, Inc., 1999. Some other known implementations and derivatives of the Linda language are WCL, PageSpace, TuSCon, Jada, TSpaces, KLAIM, Lime, C-Linda, Paradise, Melinda, Ease, Lucinda, FORTRAN-Linda, LindaLISP, and Prolog-Linda.

Tuple space based coordination languages can provide the essential features (spatial and temporal separation) required for many different types of distributed applications, especially for use over the Internet. Developed by scientists and academicians, the Internet was originally used to share research information and to collaborate. However, the Internet now encompasses millions of world-wide computers networked together.

The Internet functions as an object-based multimedia system. It allows for the creation, storage, and delivery of multimedia objects. Numerous on-line service providers, such as Microsoft Network, CompuServe, Prodigy, and America Online, have linked to the Internet. This enables their customers to access a variety of products and services available from independent content providers and other Internet users. For example, a typical customer can access electronic mail, news services, travel services, investment and banking services, online stores and malls, entertainment services, and many other services on the Internet.

There are two distinct types of implementations of tuple space based coordination languages (e.g. Linda), characterized as being either "closed" or "open". The closed implementations use compile time analysis of object and source code to provide highly efficient closed programs. The open implementations allow processes, agents, and programs to coordinate through tuple spaces without the run-time system requiring any prior knowledge. Essentially, the open implementations provide a persistent data store.

The Linda language uses three standard instructions or primitives. These are (with their informal semantics):

(1) out(tuple) Insert a tuple into a tuple space.

(2) in(template) If a tuple exists that matches the template, then remove the tuple and return it to the agent performing the in. If no matching tuple is available, then the primitive blocks until a matching tuple is available.

(3) rd(template) If a tuple exists that matches the template, then return a copy of the tuple to the agent that performed the rd. If there is no matching tuple, then the primitive blocks until a matching tuple is available.

The informal semantics of the in primitive leads implementers to remove the tuple that is returned to the agent from the tuple space when the in primitive is performed. However, this causes an efficiency problem in a distributed computer system where multiple users may be concurrently trying to access a particular tuple, because they can be blocked from accessing the tuple until a matching tuple is available.

Thus there is a significant need to modify existing tuple space based coordination languages to improve their efficiency of execution on large, open implementations, particularly on distributed computer systems, so that users are not unnecessarily blocked from accessing tuples.

There is also a significant need to modify existing tuple space based coordination languages to improve their efficiency of execution on closed implementations, particularly on high-performance parallel computer systems, so that users are not unnecessarily blocked from accessing tuples.

SUMMARY OF THE INVENTION

The above-mentioned shortcomings, disadvantages, and problems are addressed by the present invention, which will be understood by reading and studying the following specification.

The present invention includes a number of different aspects for improving the performance of a data processing system. For the purposes of describing this invention, the term "performance" is intended to include within its meaning not only the operational performance, but also the function, structure, operation, code, and behavior of a data processing system.

While the invention has utility in increasing the performance of distributed and parallel-processing systems, its utility is not limited to such, and it has utility in increasing the performance of a wide spectrum of data processing systems, particularly those that utilize tuple space based coordination languages.

An optimization to tuple space based coordination languages has been developed for improving concurrency within data processing systems utilizing such languages. With improved concurrency, more processes can run on such systems concurrently rather than having to wait for one or more other processes to finish.

The present invention solves the above stated problems of existing tuple space based coordination languages by providing an efficient optimization that can be implemented as an extension to such languages. The extension increases concurrency by lessening tuple removal, without requiring compile time analysis, altering existing primitives, or adding new primitives.

The optimization is based upon certain conditions which, if met, enable a tuple to remain visible in tuple space thereby reducing the number of occurrences when accesses to the tuple cause blocking, so that other processes can continue to read the tuple while a first process is updating the tuple.

Subsequent access to a tuple that has been accessed by another agent is permitted, but only under certain conditions. Generally, if any of these conditions isn't true, then we block the subsequent access. The term "agent" is used herein to mean the entities or components of the computer system that communicate including, but not limited to, applications, programs, processes, or "traditional" agents.

The optimization provided by the present invention is sometimes referred to as "tuple ghosting", because a tuple is permitted to remain in tuple space for limited purposes and under certain conditions, when under normal circumstances it should have been deleted.

In another embodiment of the invention, a run-time optimization modifies the conditions if the execution is in a closed system that is known not to contain deadlock, further improving performance.

The present invention describes systems, clients, servers, methods, computer-readable media, and data structures, all of varying scope. In addition to the advantages of the present invention described in this summary, further advantages of the invention will become apparent by reference to the drawings and by reading the detailed description that follows.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 9 is a diagram of a data structure for use in an exemplary implementation of the invention.

DETAILED DESCRIPTION OF THE INVENTION

In the following detailed description of exemplary embodiments of the invention, reference is made to the accompanying drawings that form a part hereof, and which show by way of illustration specific exemplary embodiments in which the invention may be practiced. These embodiments are described in sufficient detail to enable those skilled in the art to practice the invention. It is to be understood that other embodiments may be utilized and that logical, mechanical, electrical, and other changes may be made without departing from the spirit and scope of the present invention. The following detailed description is, therefore, not to be taken in a limiting sense, and the scope of the present invention is defined only by the appended claims.

The detailed description is divided into ten sections. The first section describes the hardware and the operating environment in conjunction with which embodiments of the invention may be practiced. The second section provides an understanding of the tuple space multiple-access problem by analyzing tuple space run times. The third section further analyzes the histories of tuple space access using run-time traces. The fourth section provides a set of rules for when a tuple should remain or disappear, both for Linda-like languages and for extensions of Linda-like languages. The fifth section provides a general statement of the rules. The sixth section describes the implementation of the invention. The seventh section describes how the rules can be modified for closed systems not employing deadlock. The eighth section describes methods for an exemplary embodiment of the invention. The ninth section describes a particular data structure implementation of the invention. Finally, the tenth section provides a conclusion of the detailed description that describes some potential benefits and describes further alternative embodiments.

Exemplary Hardware and Operating Environment

Figure 1:
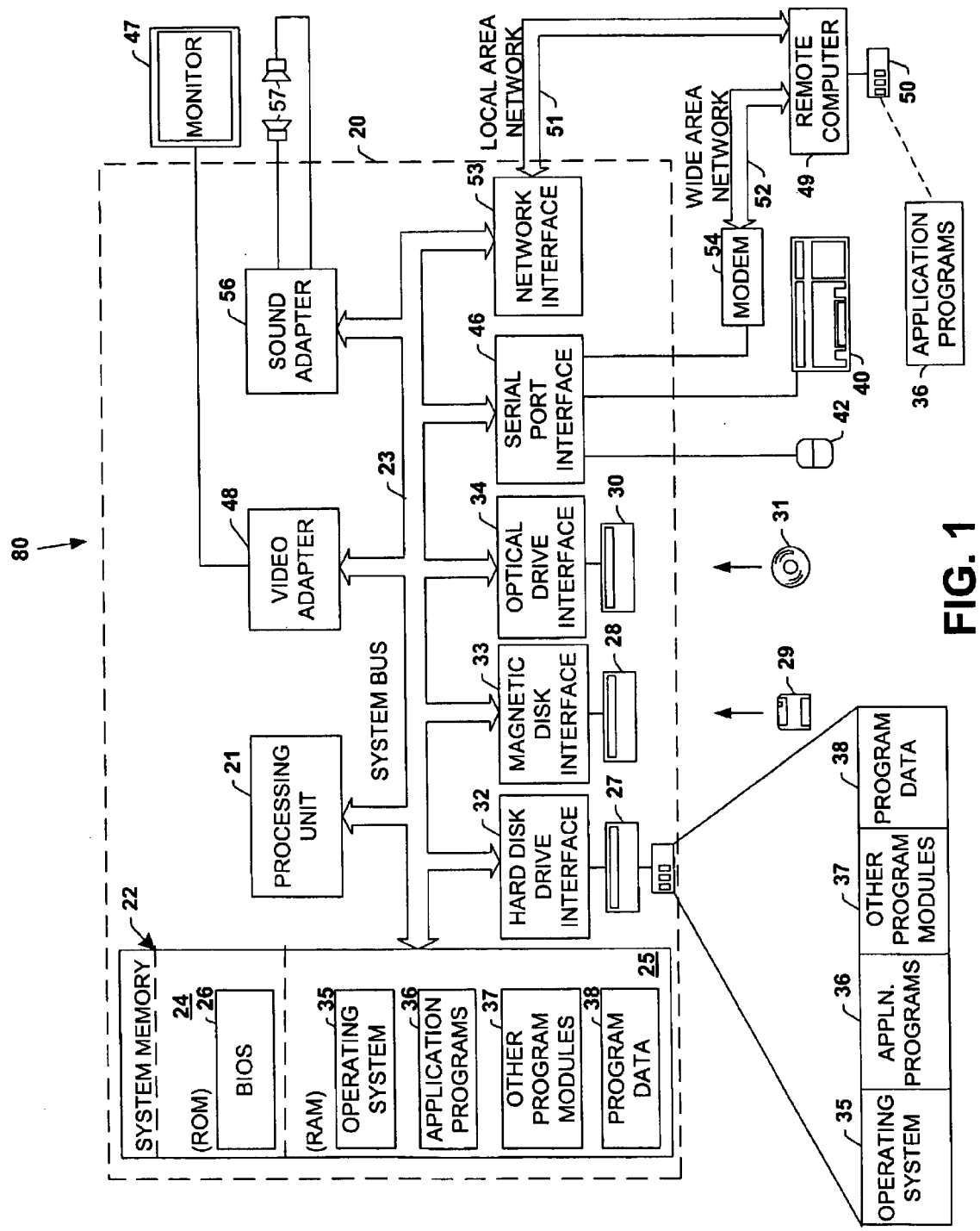
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is but one embodiment of many different computer configurations that may be used to implement the present invention. Generally, program modules include routines, programs, objects, components, data structures, etc. that perform particular tasks or implement particular abstract data types.

Moreover, those skilled in the art will appreciate that the invention may be practiced with other computer-system configurations, including hand-held devices, multiprocessor systems, microprocessor-based or programmable consumer electronics, network personal computers ("PCs"), minicomputers, mainframe computers, and the like. The invention may also be practiced in distributed computing environments where tasks are performed by remote processing devices linked through a communications network. In a distributed computing environment, program modules may be located in both local and remote memory storage devices. The invention may also be practiced to advantage in parallel-processing systems, including massively-parallel systems, that utilize many processors working in a coordinated manner to solve complex, distributed, and/or lengthy computations.

FIG. 1 shows a general-purpose computing or information-handling system 80. This embodiment includes a general purpose computing device such as personal computer (PC) 20, that includes processing unit 21, a system memory 22, and a system bus 23 that operatively couples the system memory 22 and other system components to processing unit 21. There may be only one or there may be more than one processing unit 21, such that the processor computer 20 comprises a single central-processing unit (CPU), or a plurality of processing units, commonly referred to as a parallel processing environment. The computer 20 may be a conventional computer, a distributed computer, or any other type of computer; the invention is not so limited.

In other embodiments other configurations are used in PC 20. System bus 23 may be any of several types, including a memory bus or memory controller, a peripheral bus, and a local bus, and may use any of a variety of bus architectures. The system memory 22 may also be referred to as simply the memory, and it includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system.

Personal computer 20 further includes hard disk drive 27 having one or more magnetic hard disks onto which data is stored and retrieved for reading from and writing to hard-disk-drive interface 32, magnetic disk drive 28 for reading from and writing to a removable magnetic disk 29, and optical disk drive 30 for reading from and/or writing to a removable optical disk 31 such as a compact disk read-only-memory (CD-ROM), digital video disk (DVD), or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives 27, 28, and 30 and their associated computer-readable media 29, 31 provide nonvolatile storage of computer-readable instructions, data structures, program modules and other data for personal computer 20. Although the exemplary environment described herein employs a non-removable hard disk in a hard disk drive 27, a removable magnetic disk 29, and a removable optical disk 31, those skilled in the art will appreciate that other types of computer-readable media which can store data accessible by a computer may also be used in the exemplary operating environment. Such media may include magnetic tape cassettes, flash-memory cards, digital video disks (DVD), Bernoulli cartridges, RAMs, ROMs, and the like.

In various embodiments, program modules are stored on the hard disk drive 27, magnetic disk 29, optical disk 31, ROM 24 and/or RAM 25 and may be moved among these devices, e.g., from hard disk drive 27 to RAM 25. Program modules include operating system 35, one or more application programs 36, other program modules 37, and/or program data 38. A user may enter commands and information into personal computer 20 through input devices such as a keyboard 40 and a pointing device 42. Other input devices (not shown) for various embodiments include one or more devices selected from a microphone, joystick, game pad, satellite dish, scanner, and the like. These and other input devices are often connected to the processing unit 21 through a serial-port interface 46 coupled to system bus 23, but in other embodiments they are connected through other interfaces not shown in FIG. 1, such as a parallel port, a game port, or a universal serial bus (USB) interface. A monitor 47 or other display device also connects to system bus 23 via an interface such as a video adapter 48. In some embodiments, one or more speakers 57 or other audio output transducers are driven by sound adapter 56 connected to system bus 23. In some embodiments, in addition to the monitor 47, system 80 includes other peripheral output devices (not shown) such as one or more of a scanner, printer, microphone, joystick, game pad, satellite dish, scanner, and the like.

In some embodiments, personal computer 20 operates in a networked environment using logical connections to one or more remote computers such as remote computer 49. Remote computer 49 may be another personal computer, a server, a router, a network PC, a peer device, or other common network node. Remote computer 49 typically includes many or all of the components described above in connection with personal computer 20; however, only a storage device 50 is illustrated in FIG. 1. The logical connections depicted in FIG. 1 include local-area network (LAN) 51 and a wide-area network (WAN) 52, both of which are shown connecting PC 20 to remote computer 49; typical embodiments would only include one or the other. Such networking environments are commonplace in offices, enterprise-wide computer networks, intranets, and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20 and connects to system bus 23 via serial-port interface 46 in the embodiment shown. In a networked environment, program modules depicted as residing within PC 20 or portions thereof may be stored in remote-storage device 50. Of course, the network connections shown are illustrative, and other means of establishing a communications link between the computers may be substituted.

Understanding the Multiple-Access Problem by Analyzing Tuple Space Run Times

As mentioned above, the present invention is particularly adapted for use with centralized (or federated) open servers to support tuple space usage on large-scale, enterprise-wide, distributed computer systems. A number of different embodiments can be applied at run-time, as will be discussed below.

In this description we will analyze the semantics of the Linda in primitive, or to generalize, of any blocking primitive that destructively removes tuples from a tuple space.

Throughout the description we will primarily discuss the three standard Linda primitives, and their traditional (informal) semantics as set forth earlier: the out, the in, and the rd.

According to the present invention, a tuple that has been destructively removed using an in does not actually have to be removed from the tuple space, but it can be made "partially visible". Partially visible means that it can be used as a valid result tuple for a subset of the access primitives (in the case of Linda, e.g., the tuple can be used as a result for a rd primitive). We provide a set of rules that describe when a tuple is partially visible. When a set of further conditions is met, the tuple then becomes invisible to all agents, and it can be discarded.

In Linda-like programs it is common to store data structures in the tuple spaces. This means that from an application programmer's point of view the programs are often written in a peer-to-peer style rather than a client-server style. However, this means that when parts of the data structure being held in the tuple space are being updated, tuples are removed from the tuple space, updated by a client, and then re-inserted.

As an example, consider a list stored in a tuple space, wherein the items of the list are stored as tuples. Each tuple has a unique number as the first field that represents its position in the list. In the tuple space assume that there is a single tuple that contains a shared counter. In order to add an element to the list, the shared counter is removed using an in primitive, the value of the counter is incremented, the tuple is re-inserted, and then a new tuple is inserted containing the number of the counter and the data. This is a common data structure used in Linda-like programs.

This is a common operation, and there have been proposals for the addition of new primitives to help perform the update of the shared counter, for example in the Linda-like language, Eilean, and when using compile time analysis to convert the in followed by the out into a single operation. The motivation for these proposals is that, once the shared counter is removed, any other agent attempting to read the counter cannot do so. Therefore, even if it wished to read the elements in the list it had to wait until the counter tuple was reinserted. This tuple acts as a bottleneck, degrading the performance of the system.

The use of compile-time analysis to transform the two operations into a single operation relies on complex analysis, and in many cases it cannot be caught. The addition of one or more new primitives at first appears attractive, e.g. a primitive that removes a tuple of a certain pattern and then inserts a new tuple of a defined pattern. However, specifying the contents of the new tuple in a generic way is difficult. It is usually a restriction that the counter tuples always be of the same form (e.g. the counter appears in the same place in the tuple), and there are also restrictions on the types that can be used for the counter. It would be difficult to create a primitive that can provide the functionality to deal with arbitrary tuples, given that Linda is computational language independent. It should also be noted that the proposed new primitives provide support for only a very specific case. Therefore, these types of primitives have never been widely adopted.

For systems that support LAN-wide use of tuple spaces, the time taken to remove a tuple, update it, and reinsert it is small. However, systems that support enterprise-wide coordination have a much larger network latency and due to the speed of light there will always be network latency, so the time to perform an operation will always be greater than zero and proportional to the geographical distance between the agent and the location where the tuple is being stored. Therefore, when an agent removes a tuple, updates it, and then reinserts it, as with the above example, the tuple will be missing from the tuple space for, in computing terms, a considerable time.

What this means is that if we can somehow leave a tuple visible after it should have been removed, without altering the semantics of Linda, then we can potentially overcome some of the time cost of getting data out of the tuple space, moving it across a network to an agent, and then moving it back into the tuple space. By doing this we can significantly increase the level of concurrency within the system by substantially reducing the effect of the tuple acting as a bottleneck.

Figure 2:
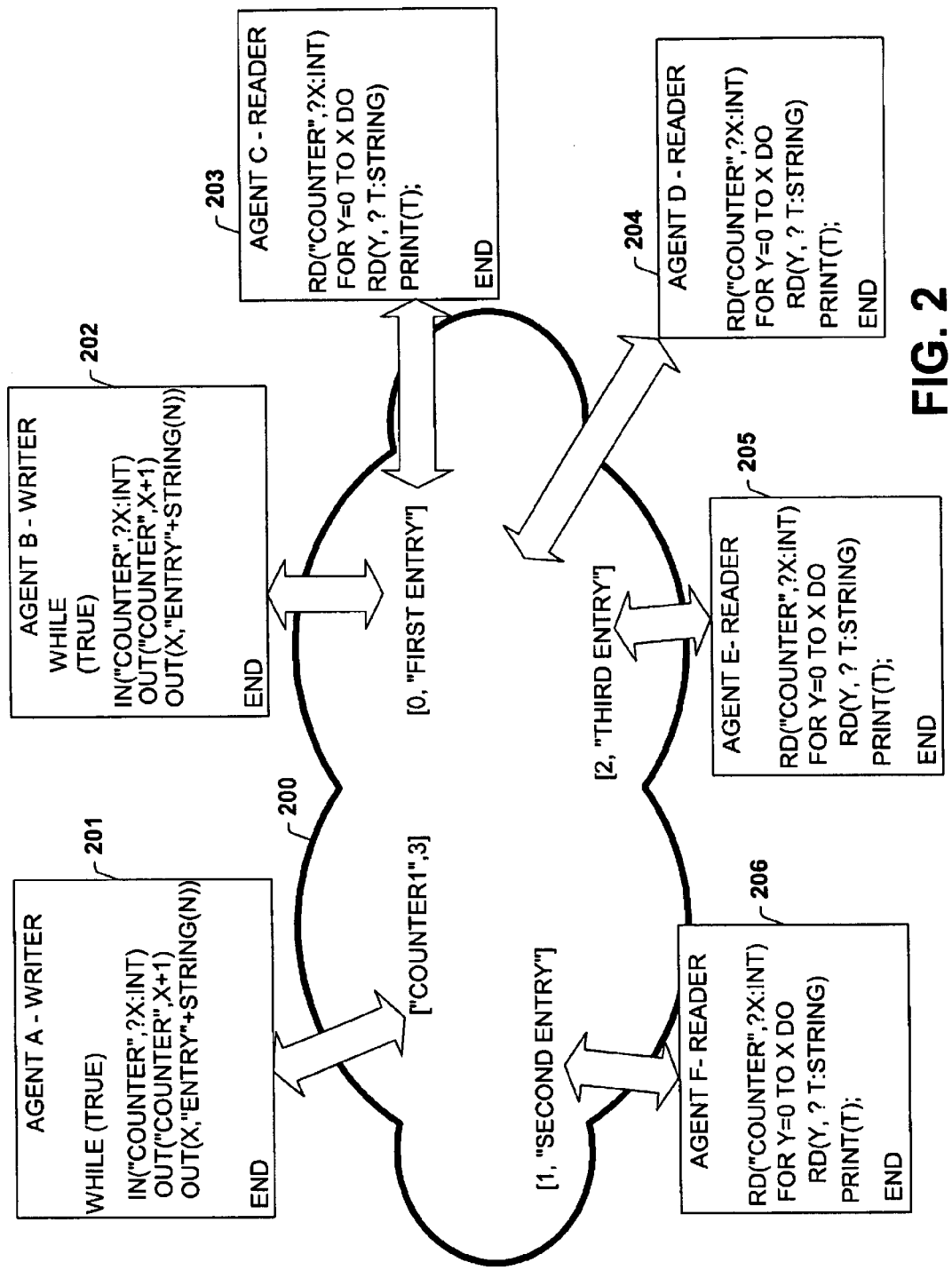
FIG. 2 is a diagram illustrating a tuple space containing a tuple that can be accessed concurrently by multiple agents, in accordance with one embodiment of the invention.

FIG. 2 is a diagram illustrating a tuple space containing a tuple that can be accessed concurrently by multiple agents or entities, in accordance with one embodiment of the invention. Multiple writers 201–202 and multiple readers 203–206 have access to a list data structure stored in a tuple space 200.

Using a traditional run-time system, assume that the tuple ["COUNTER1",integer] is removed by writing agents 201 or 202, e.g. by performing an in primitive. If any of the reading agents 203–206 is subsequently started, they will block when accessing that tuple. In an optimized run-time system provided in one embodiment of the present invention they will not block, thereby achieving a higher level of concurrency.

We have just examined the problem of blocking in a typical Linda-based multiple access system. Now we are going to more closely analyze tuple space access by examining some run-time traces.

Analyzing Histories of Tuple Space Access

Figure 3:
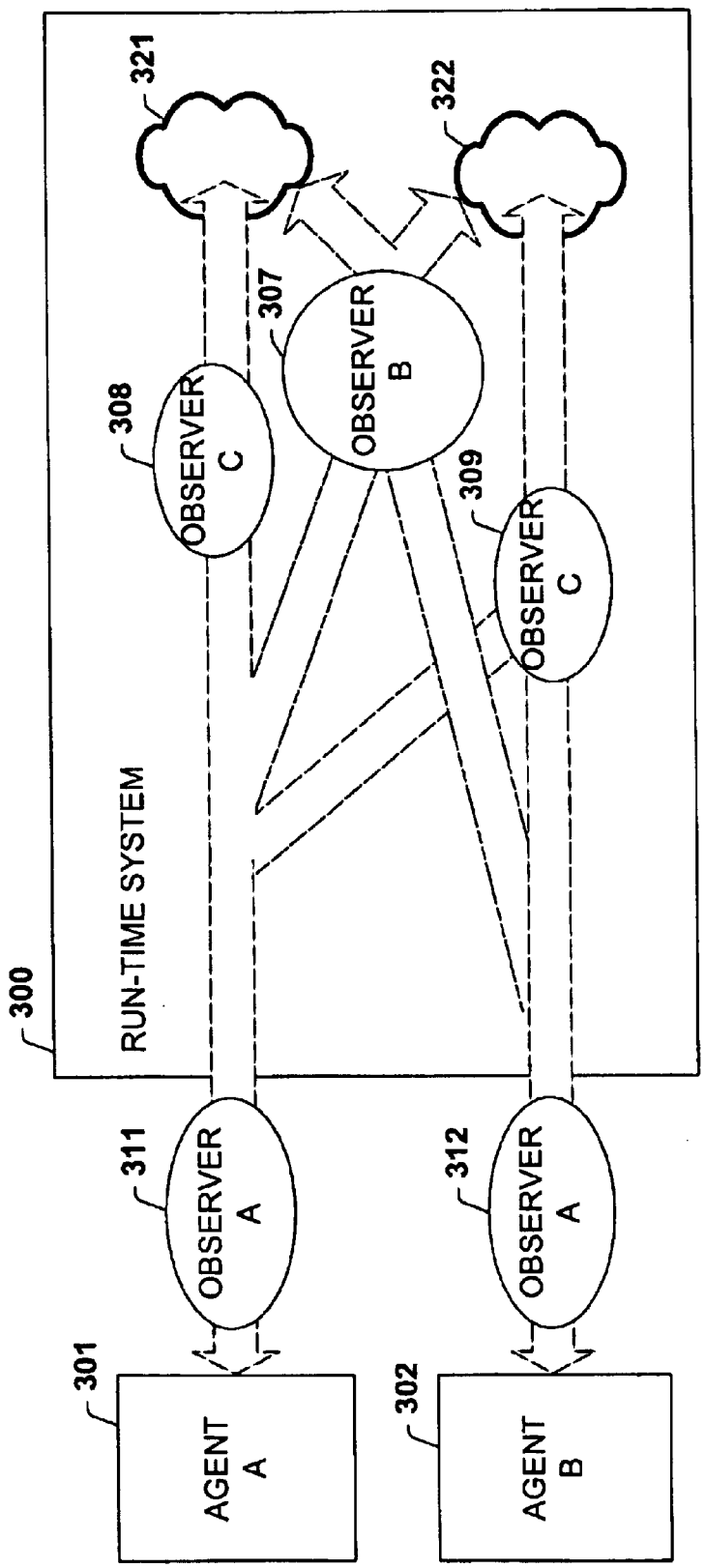
FIG. 3 is a diagram illustrating several different observation points in a tuple space system.

FIG. 3 is a diagram illustrating several different observation points in a tuple space system. Tuple space access can be better understood by constructing and reviewing sequences of the execution of primitives that are accessing or trying to access tuple space. These can be constructed from the perspective of a global observer 307, a tuple space observer 308 or 309, or an agent observer 311 or 312.

For a global observer 307, the stream of all primitives to and from the run-time system is observed, and this is the trace. For a tuple space observer 308 or 309, the stream of all primitives to and from a particular tuple space is observed. For an agent observer 311 or 312, the stream of all primitives to and from a particular agent 301 or 302, respectively, is observed.

It is assumed that there are no hidden communication channels between the two agents 301 and 302, and that the only way the two agents can communicate is via a tuple space 321 and/or 322.

The different observers are shown in FIG. 3, wherein the areas 311–312 labeled "Observer A" create agent traces, the area 307 labeled "Observer B" creates global traces, and areas 308–309 labeled "Observer C" create tuple space based traces. The "dash" arrows show the flow of primitives when tuple space based traces are being created, and the "dash-dot-dot-dash" arrows show the flow of primitives when global traces are being created.

If Observer B is being used (global trace), then all tuple space accesses are sequential. In this case, Observer B must decide how to convert concurrent tuple space requests into a sequential stream. If Observers C are being used, then the primitives to each tuple space are sequential. However, different tuple spaces can be accessed concurrently. It should be noted that both these traces are collectable using centralized and tuple-space based run-time systems used for WAN-based systems. We assume that a primitive only appears in the trace when the primitive is completed. Given the basic informal semantics of Linda (and assuming all agents terminate), it is possible to create a finite set of all possible traces for a set of agents. However, both these traces enforce a sequential ordering on the primitives.

In reality the primitives can occur in parallel and indeed many LAN-based implementations support parallel access to a single tuple space. The Observers A can capture this, by observing the stream of operations into and out of single agents. Before considering these traces, let us consider the global trace (Observer B) and tuple space trace (Observer C) using an example. In the example, let us consider two very simple Agents A and B that interact as set forth in Table I:

TABLE I

| Agent A | Agent B |
|---------|---------|
| A1 out(a) | B1 in(a) |
| A2 rd(a) | B2 out(b) |
| A3 rd(b) | B3 out(a) |

Figure 5:
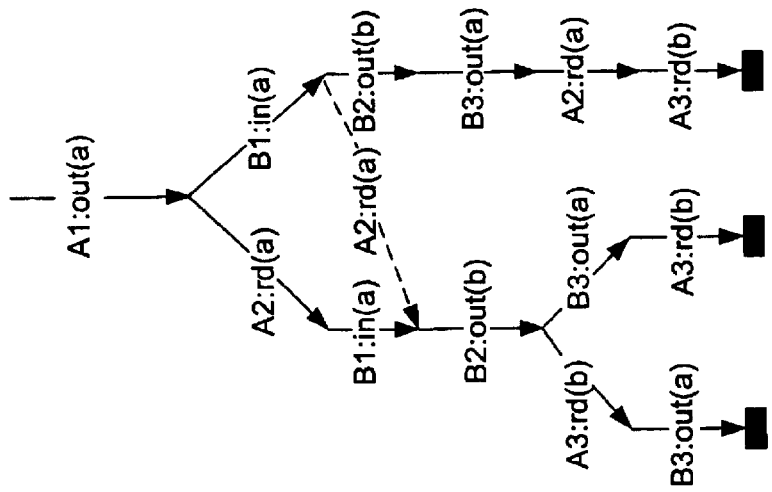
FIG. 5 is a case graph describing the sequential interactions possible between Agents A and B performing the primitives of Table I.
Figure 4:
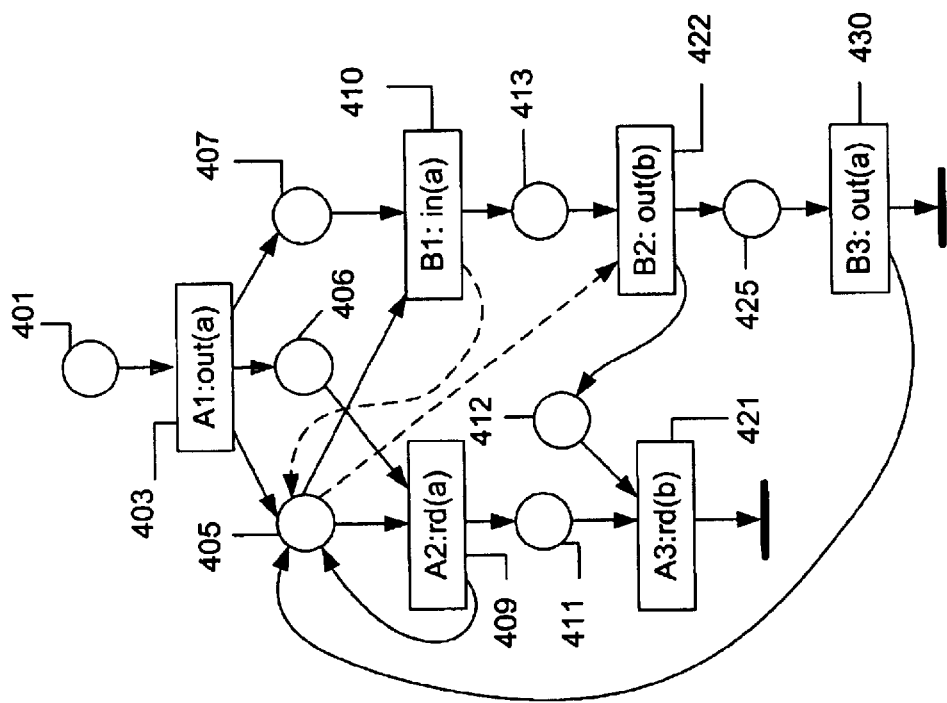
FIG. 4 is a Petri Net diagram describing the sequential interactions possible between Agents A and B performing the primitives of Table I.

The interaction of Agents A and B in accordance with TABLE I can be more easily understood with reference to FIGS. 4 and 5.

FIG. 4 is a Petri Net diagram describing the sequential interactions possible between Agents A and B performing the primitives of Table I, and FIG. 5 is a case graph describing the same sequential interactions. The Petri Net and case graph are created according to the semantics for the Linda primitives as given earlier, if one initially ignores the dashed links in FIGS. 4 and 5.

The Petri Net diagram and case graph are diagrammatic ways to visually describe the execution paths that Agent A and B can perform and, more specifically, the sequential interactions possible between Agents A and B.

A Petri Net is a method of visually describing the possible states that a program can go through. The boxes 403, 409, 410, 421, 422, and 430 in FIG. 4 represent "rules" that can be fired. They can only be fired when every circle 401, 405–407, 411–413, and 425 leading into them contains an imaginary marker or token. When they fire, they consume one marker from each of their input circles, and they place a marker in each of their output circles.

If a list of the firings is produced, then it will be one of the paths shown in the case graph of FIG. 5. Whenever there are multiple rules that could be fired, then one is chosen. Wherever the case graph splits, it means two rules could have fired. Firing one leads to one execution path, and firing the other leads to the other execution path.

So, at the start of execution, there is a single marker in the top circle 401 of the Petri Net of FIG. 4. Therefore, the only rule that can fire is A1:out(a) in box 403, which firing places a marker into each of the three circles 405–407 leading from box 403 (ignore the dashed lines).

Then, either A2:rd(a) in box 409 or B1:in(a) in box 410 can fire, so the case graph splits. If B1:in(a) fires, it removes the markers in its input circles 405 and 407. Thus A2:rd(a) can no longer fire, as one of its input circles 405 and 406 (specifically input circle 405) is empty. Then B2:out(b) in box 422 can fire, because there is now a marker in its input circle 413, and this firing produces two markers, in circles 412 and 425. And the execution continues in a similar manner.

In FIGS. 4 and 5 the dashed links represent one embodiment of the optimization that is provided by the present invention. More specifically, this occurs where the in at B1 is executed before the rd at A2 and before the out at B3 is performed. This means that a removed tuple (in this case "a") has been returned (in this case to Agent A via the rd at A2) after it was removed (but before Agent A could know that the Agent B had removed the tuple). From the global perspective this appears to be incorrect, because returning a tuple that has been removed is incorrect. However, when a programmer is writing a program, he or she will assume that this can happen because of the non-deterministic nature of Linda. If two agents perform an in and a rd concurrently there is no way of knowing whether the rd will see the tuple, and it is this property we are exploiting. By looking at the agent observer traces, one can see why this is valid.

The agent observer traces for Agent A are:
Trace (1) $\{A_1, [A_1] A_2, [A_1, B_1, B_2] A_3\}$,
Trace (2) $\{A_1, [A_1, B_1, B_2, B_3]A_2, [A_1, B_1, B_2] A_3\}$,
and the agent observer trace for Agent B is:
Trace (3) $\{[A_1] B_1, B_2, B_3\}$.

Each trace contains the completed primitives that the respective Agent A or Agent B has performed. This trace is augmented with a list of the primitives that other agents must have performed in order for the primitive in the trace to complete. The syntax of the trace is such that the primitives that other agents must have performed is shown in the brackets [ ] appearing before the primitive entry.

This trace is capturing what the agent can observe about the system, and from one agent's perspective it does not know when the primitives of the other agent(s) were performed in relation to the primitive it has just performed, but it knows that primitives must have been performed and completed when the current primitive completes. It should be noted that an agent only knows that when the current primitive completes, that the primitives by the other agent(s) have been performed.

There are two traces for Agent A, because the operation A2 can read the tuple "a" produced by either operation A1 or operation B3. The first trace given is when A2 reads the tuple "a" produced by operation A1. Where a primitive retrieves a tuple that it has inserted, for clarity, the operations number has been included in the [ ] entry in the trace. It can be assumed that at any point in the trace an agent can deduce which operations it has performed (so this information could be omitted). At any point in the trace the union of the operations appearing in [ ] before that point in the trace represents what an agent can deduce about what other agents have done.

If there were more than two agents, then the information about what other agents have completed (e.g. the [ ] entries) could contain entries for each agent. As an example, let us consider the following three agents A, B, and C interacting as set forth in Table II:

TABLE II

| Agent C | Agent D | Agent E |
|---------|---------|---------|
| C1 out(a) | D1 in(a) | E1 in(b) |
|  | D2 out(b) |  |

The trace for Agent C is:
Trace (4) $\{C_1\}$
The trace for Agent D is:
Trace (5) $\{[C_1] D_1, D_2\}$
And the trace for Agent E is:
Trace (6) $\{[C_1, D_1, D_2] E_1\}$ In this case the first entry for the trace for Agent E contains an entry indicating that the $C_1$, $D_1$ and $D_2$ operations can be deduced as completed.

This representation is closer to the model that the programmer has when working out the coordination patterns of a program using tuple spaces. This trace also allows one to consider exactly what an agent (or correctly the author of an agent) can assume has occurred up to any stage.

Referring again to Traces (1) through (3) for Agent A and Agent B previously discussed, let us concentrate on the operations identified as $A_2$ and $B_1$. These are a rd and in operation on the same tuple "a", respectively. What is interesting is that Agent B does not know whether the operation A2 is ever performed (the two agents never exchange tuples after operation B1 and therefore Agent B cannot know what has or has not been executed). Also note that Agent A knows that operation B1 has been performed only when it observes that operation $B_2$ has occurred. From Traces (1) and (2) we can see that this is when operation A3 completes.

Even more interesting is that Trace (1) for Agent A shows that operation A2 is independent of operation B1. When operation A2 is performed, Agent A does not know whether tuple "a" has been removed. Therefore, even if tuple "a" was destructively removed, Agent A cannot know that has happened. Agent A will only learn this after operation A3 has been performed. Programmers are quite used to this asynchronous and non-deterministic behavior of tuple space based coordination.

Based upon this observation, we determine that it is quite acceptable for a run-time system to give the same tuple to both A and B regardless of whether operation A2 or operation B1 is serviced first, provided that operation A3 has not been performed. Traditionally, one would say that if operation B1 has been serviced, then operation A2 must block until operation B2 is performed. However, it should be noted that once the in primitive has been performed, the tuple must become read-only, because there can only ever be one copy of a tuple destructively removed from a tuple space, and also the tuple must not be visible to the agent which performed the in primitive. If this were not the case, we would end up with multiple copies of the same tuple.

Summarizing our analysis of tuple space access histories using traces, given a trace for an agent p, a rd performed by agent p can return a tuple that has already been removed using an in by another agent, unless the trace for agent p either contains or will contain a reference to the in primitive (which removed the tuple) when the rd primitive terminates. It should be noted that if there are multiple agents, it is possible to observe the primitive which removed the tuple, by observing the in primitive in the trace, even without any communication with the agent that removed the tuple, as demonstrated above.

Rules for When a Tuple Should Remain or Disappear (a) Primitives for Linda-Like Languages In the previous section it was demonstrated, using traces, why a tuple can reside in a tuple space after it has been destructively removed. It would be rather impractical in an efficient implementation to pass the agent traces around with the tuples, because they could become very large. However, by generalizing the principles learned from analyzing traces for tuple space accesses, an elemental set of rules can be provided that can be easily implemented with little overhead.

What the traces show is that an agent can read a tuple that has been removed, provided that the agent has no way of knowing that the other agent has removed the tuple.

Therefore, when a tuple is matched by an in primitive it will remain in the tuple space, subject to the following rules:

1. It cannot be returned as a result of an in, only as the result of a rd (in other words it is to be read-only, because there can only ever be one copy of a tuple destructively removed from a tuple space).

2. The agent which performed the in that matched the tuple cannot see the tuple anymore (otherwise the same agent could remove a tuple and then read the same tuple, which would be incorrect).

3. When the agent which performed the in on the tuple inserts any other tuple, terminates, or spawns/creates another agent the tuple must be removed. (Termination and spawning/creating are added, because these can be used as hidden communications channels, passing information to other agents.)

If these rules are followed, the traces generated by the per agent traces remain the same, and the semantics of the access primitives for Linda-like languages are preserved.

It is Rule 3 above, regarding the insertion of any tuple into a tuple space by the agent that removed the tuple, that means that we no longer require the tuples to have the sets of performed primitives attached to them. In the agent traces discussed in the previous section, a trace contained the information describing whether we had indirectly synchronized with another agent and, therefore, whether we could not use a tuple the other agent had consumed. By generalizing the rule to say "whenever a tuple is inserted, the tuples that the agent has consumed are no longer available as results", we make the use of this technique in various implementations feasible, and this will be discussed in the section below entitled "Implementations". (As will be seen below, Rule 3 will evolve into two different forms, Condition C for use with either open or closed systems, and Condition C1 for improved performance in certain closed systems.)

However, from an implementation perspective it means that a tuple can remain visible after the tuple has been removed. So, in the example given above where a single tuple was being used as a counter for a list stored in a tuple space, it is possible for other processes to read the tuple while a different process is updating the tuple.

We have considered so far the limited case where there are only three primitives. However, most modern tuple space based coordination languages have many more tuple space access primitives. Thus, in the next section we generalize the teachings of the present section to provide support for different types of primitives.

Extensions of Linda-Like Languages

The introduction of other primitives is commonplace, and it is important that any practical optimization should work with any of the current generation of tuple space languages. Each language has its own particular set of tuple space access primitives, but it is possible to create a generic set of rules that potentially covers all sets of possible tuple space access primitives. In order to create them, we need to consider the information that these primitives add.

As an example, let us consider the inp and rdp primitives. Although not necessarily widely supported, they represent a different class of access primitive, in that they are non-blocking. The inp primitive is a non-blocking variant of the in primitive, in that it looks for a tuple that matches a template, but if none is found it reports back "false" without blocking. The rdp primitive is similar to inp except that if there is a matching tuple it is not removed from the tuple space, but a copy is returned.

Consider the following two agents F and G, sharing a tuple space that no other agents are able to access, and that interact as set forth in Table III:

TABLE III

| Agent F | Agent G |
|---|---|
| while (rdp(a)); | in(a) |
| out(b) | in(b) |

In this case Agent F uses the rdp primitive to poll the tuple "a". While tuple "a" exists, tuple "b" will not be produced. It should be noted that this is a rather inefficient coordination construct, and it is difficult to imagine a real-world case when this construct would be used, but the run-time system must support it correctly. With the rules outlined in the previous section, Agents F and G would never terminate, because tuple "b" would not be produced, as tuple "a" would remain visible. The problem is caused because rdp is not a blocking primitive. However, this can easily be solved, by adding another statement governing when the tuple should be removed:

4. If a rdp primitive is performed and the matched tuple is read-only, then the tuple should not be used as the result for the primitive. Furthermore, if there are no other matching tuples available, then the marked tuple should be discarded. If another matching tuple is available as the result, then the read-only tuple can be left.

At this point in the description, it now makes more sense to describe tuples as being "marked" rather than read-only (because rdp is a non-destructive primitive). Also, some implementations support primitives beyond the basic three Linda primitives and the inp and rdp primitives. It is possible, to generalize Rule 4 yet further as follows:

4.1 If any primitive is performed which does not block the user thread of execution until a matching tuple is found, and a tuple which is to be the result (or part of the result) of that primitive is a marked tuple, then the marked tuple should not be used as the result or part of the result. If the marked tuple is the only available result or should be part of the result, it must be removed; otherwise, it can remain.

This Rule 4.1 generalization is slightly conservative, in that sometimes tuples will disappear before they need to, but it ensures that the rules should work with any set of access primitives. All of the rules are shown below, rewritten in general terms to provide a set of rules for when a tuple can be returned and when a tuple should be discarded.

General Statement of the Rules

When a tuple has previously been the result, or part of a result, for a destructive primitive, then the tuple can still be used as a result to a subsequent primitive, provided that the following conditions are all true:

A. The subsequent primitive is not destructive. (In other words, the tuple would still be present in the tuple space after the subsequent primitive has completed.)

B. The subsequent primitive is not being performed by the same agent or entity that performed the destructive primitive. (I.e., the first and subsequent agents are not one and the same.)

C. The agent that performed the destructive primitive has not performed any tuple space access since the destructive primitive, or created any new agents, or terminated.

D. The subsequent primitive being performed blocks the agent's thread of execution until a result is returned, where a result is either a tuple or an indication of completion of some movement of tuples. (Primitives such as rdp fail this rule, because they do not block the thread of execution; rdp returns false if a tuple is not available. However, a primitive like copy-collect passes the rule, because it copies tuples and then returns a counter.)

The system must subsequently discard this tuple when any of the following conditions is true:

E. The agent that performed the destructive primitive performs any operation on a tuple space.

F. The agent that performed the destructive primitive terminates.

G. The subsequent non-destructive primitive does not block the user thread of execution until one or more matched tuple are found or operation on a set of tuples is complete, and it is forced to use the tuple to provide the results correctly.

It is assumed that there are no hidden communications channels between the agents and that the only way the agents can communicate is via a tuple space. Rule C partly covers hidden communication, because the creation of a new agent is hidden communication.

Rules A–G describe an optimization algorithm for an embodiment of the present invention. An "algorithm" is defined as a sequence of computer-executed operations leading to a desired result. These steps generally require physical manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, structures, or the like. It should be kept in mind, however, that these and similar terms should be associated with appropriate physical quantities for computer operations, and that these terms are merely conventional labels applied to these physical quantities that exist within the computer.

In an efficient implementation of the above rules via an extension to the kernel of a Linda-like language or derivative thereof, the above rules should be transparent to the programmer, and the semantics of the primitives should not appear to be different from the traditional semantics of the basic Linda primitives.

In some embodiments, operation with only a subset of the above conditions may be possible, although the execution must first be carefully studied to determine the potential impact on the particular code. In an environment wherein the code is carefully controlled, it is possible that the optimization of the present invention can be carried out with a small subset of the above conditions, including just one condition.

Implementation

The implementation of the optimization summarized in the above section entitled "General Statement of the Rules" is straightforward. For example, a Java-based kernel can be extended to use this optimization. It is a centralized kernel, as are most of the kernels currently being used for the recently developed tuple space based coordination languages.

It supports the standard Linda primitives as well as the collect and copy-collect primitives. The collect primitive moves all tuples matching a given template from one tuple space to another and returns a count of the number of tuples moved. Therefore, it is a blocking primitive. The copy-collect primitive performs the same function as the collect primitive, except that it copies rather than moves the tuples. Therefore, it follows the rule set given in the section entitled "General Statement of the Rules".

Every agent using the run-time system has a Globally Unique Identifier (GUID) created dynamically as it starts to execute. When the agent registers with the run-time system, the GUID is passed to the run-time server, and it creates a counter associated with the agent.

Each time an agent performs any operation wherein it accesses tuple space, the counter associated with that agent is incremented by one (before the primitive is performed). When an agent requests a tuple using an in primitive, or when a set of tuples is moved from one tuple space to another tuple space using a collect primitive, the affected tuples are marked as "special" and are tagged with the GUID of the agent that removed or moved the tuple and with the current value of the primitive count associated with that agent.

Any other agent can then perform a rd or copy-collect primitive and return this tuple as the result or part of the result (assuming it matches the template used). However, whenever the tuple is matched, the system compares the current primitive count for the agent whose GUID was attached to the tuple with the primitive count that was previously attached to the tuple. If the primitive counts differ or if the agent has terminated, then the tuple is discarded, and it not used as a result for the rd or copy-collect operation.

Checking of the tuples is performed on the fly, and the data structure can be organized that the most recently inserted tuple will be found first, thereby minimizing the chances of having to perform the tuple checking. However, it is likely that old tuples will remain in the system for some time, and some form of garbage collection of the old tuples is required. This garbage collection can be run as a background task, or it can be performed when the data structure becomes too large.

Figure 6:
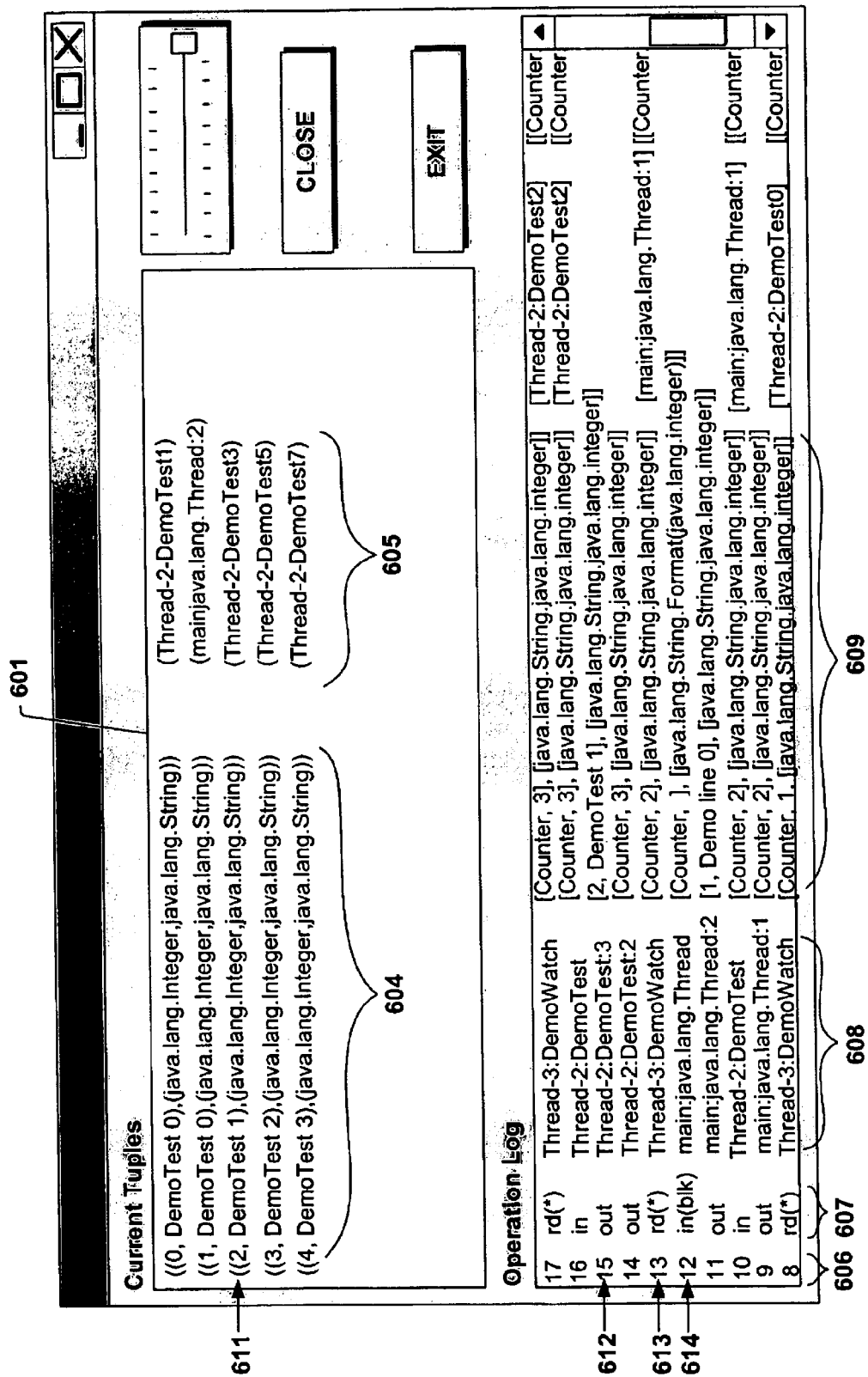
FIG. 6 is a screen print of a tool that dynamically gathers and analyzes traces produced by an embodiment of the invention.

To visually analyze the run-time operation of one implementation of the invention, we will now turn to FIG. 6.

FIG. 6 is a screen print of a tool that dynamically gathers and analyzes traces produced by an embodiment of the invention. The view shown is a tuple space view.

The upper window 601 shows the tuples currently in the tuple space and for each tuple a corresponding unique descriptor indicating which agent inserted it and the value of the primitive counter at insertion. For example, entry 611 contains a tuple "[[2, Demo Test 1],[java.lang.Integer, java.lang.String]]" in the column 604 of tuples. For entry 611, there is a corresponding entry in column 605 identifying which agent inserted this tuple, namely "[Thread-2:Demo Test]", and the value (i.e. 3) of the primitive counter for this agent at the time it inserted the tuple into tuple space, using an out primitive.

The lower window 602 shows an operation log of primitives being performed. The first entry (in column 606) for each item in the log is the log entry number (the latest, i.e. 17, being at the top). The second entry (in column 607) identifies the primitive being performed. The third entry (in column 608) is an agent identifier. The fourth entry (in column 609) identifies the corresponding tuple. The other entries in window 602 are not relevant to the description.

As an example, line 612 in window 602 contains the following: an entry "15" as the log entry number in column 606; an out as the primitive type in column 607; an agent identifier "Thread-2:Demo Test:3" in column 608 along with its primitive count (i.e. 3); and the tuple "[[2, Demo Test 1], [java.lang.Integer.java.lang.String]]" in column 609 that was entered through this particular out operation.

In column 607 of the operation log 602, any entry for a rd which is followed by [*] (e.g. in entry 613) means that the tuple returned is a tuple which would normally have been deleted if we were not using an optimization algorithm, and subsequently the primitive would have blocked.

Any primitive which blocks will have two entries, one when it starts and one when it finishes. The first entry has [blk] following the primitive type as, for example, in entry 614, which represents a blocking in primitive that has started.

A simple demonstration program based on the example given in FIG. 1 was developed, where the reader agents C–F repeatedly read the tuple ["COUNTER", integer] and printed all elements in the list. When the optimization of the invention was enabled, none of the reader agents blocked awaiting a tuple, and regularly a tuple was returned when the primitive should have blocked (in other words benefiting from the use of this optimization). When the optimization of the invention was disabled, the readers blocked a significant number of times. (It should be noted that the number of times that a single reader agent is blocked is highly dependent upon each experimental run, because of the impact of network latency on the interleaving of when primitives arrive.) Thus it has been demonstrated that the optimization of the present invention significantly increases the level of concurrency in the system.

Modification of the Rules for Closed Systems Not Explicitly Using Deadlock

An optimization algorithm as described by Rules A–G in the above section entitled "General Statement of the Rules"

can be implemented in both closed and open (i.e. distributed) systems. The following describes how Rule C of the algorithm can be eased slightly to provide additionally enhanced performance in a closed system that explicitly avoids the use of deadlock.

Deadlock is a condition that occurs when two processes are each waiting for the other to complete before proceeding. The result is that both processes hang. Deadlocks occur most commonly in multi-tasking and client/server environments. A deadlock is also called a deadly embrace.

If deadlock is explicitly employed in any tuple space system (open or closed), a tuple space access primitive could block (possibly forever) a thread of computation. Consider the following two agents H and I interacting as set forth in Table IV in a tuple space system explicitly employing deadlock:

TABLE IV

| Agent J | Agent K |
|---------|---------|
| J1 in(a) | K1 in(b) |
| J2 rd(b) | K2 rd(a) |

Let us assume that these two agents are accessing the same tuple space, that no other agents are able to access the tuple space, and that the tuple space contains two tuples, "a" and "b".

Figure 7:
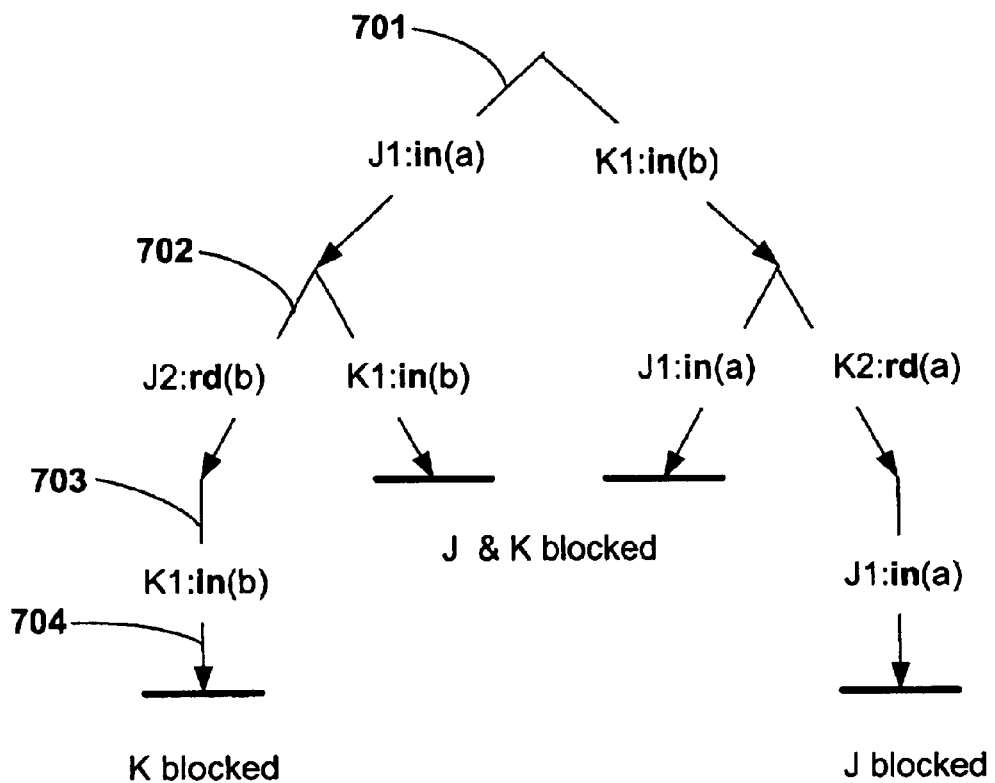
FIG. 7 is a case graph describing the sequential interactions possible between two agents J and K performing the primitives of Table IV.

FIG. 7 is a case graph describing the sequential interactions possible between the two agents J and K performing the primitives of Table IV. It is assumed that the optimization feature of the present invention is switched off. As can be seen, there is no case where both Agent J and Agent K complete. For example, looking at the trace of segments 701–703 along the left-hand side of the case graph, if Agent J executes in(a) in segment 701, followed by Agent J executing rd(b) in segment 702, followed by Agent K executing in(b) in segment 703, then Agent K is blocked at 704 from executing rd(a), because of the earlier destructive J1:in(a) operation. Each of the other three possible traces likewise end with Agents J and K blocked. Either one or both agents block, waiting for a matching tuple (which will never arrive).

In certain applications, deadlock is explicitly used, so it is desirable that the optimization algorithm of the present invention not resolve deadlocks when it is explicitly desired that they occur.

Let us now switch on the optimization feature of the present invention.

Using Rule C in the scenario described in TABLE IV above allows the two agents J and K to become deadlocked. This is because it requires tuple "a" to be discarded after operation J2, because it requires the tuple to be discarded if the agent that performed the destructive primitive (J1) has performed any tuple space access after the destructive primitive. Since tuple "a" must be discarded, Agent K is blocked from performing operation K2. But this is desirable in a system wherein deadlock is explicitly employed.

A modification can be made to Rule C that provides increased performance, but which resolves deadlocks and thus should be avoided in systems in which deadlock is explicitly used.

The modification to Rule C is as follows:

C1. The agent that performed the destructive primitive has not inserted a tuple or caused any tuples to be inserted into tuple space.

Rule C1 is less restrictive than Rule C, which states that the agent that performed the destructive primitive has not performed any tuple space access since the destructive primitive. Rule C1 would permit the agent that performed the destructive primitive to perform, for example, a rd primitive or a series of rd primitives (so long as they were not performed on a tuple on which it had a pending in operation). This allows more concurrency in the system.

However, the application of Rule C1 to the scenario described in TABLE IV above prevents the two agents J and K from becoming deadlocked. This is because it allows tuple "a" to be retained after operation J2, because it only requires the tuple to be discarded if the agent that performed the destructive primitive (J1) has inserted a tuple or caused a tuple to be inserted into tuple space access after the destructive primitive. Since tuple "a" can be retained, Agent K can perform operation K2 and terminate. However, this is undesirable in a system where a program explicitly expects one of the agents not to terminate. So Rule C1 should be avoided in an open system where it is unknown whether deadlock is being used or not. Its use should be limited to a closed system where it is known that deadlock is not being used. Alternatively, it could be employed in an open system provided that the system user was cautioned about its use with programs that explicitly employed deadlock. Some commercial versions of Linda employ optimizations for the out primitive that also potentially lead to ill-behaving programs. The cases where such optimizations alter the behavior of the system are identified in the published reference materials for Linda.

In a closed system, such as C-Linda, which is commercially available from Scientific Computing Associates, Inc., it is possible for a programmer to know whether one can expect tuple space accesses to block forever, and to switch the Rule C1 optimization on accordingly if deadlock is not expected. Thus, the Rule C1 optimization could be used as a run-time flag in closed implementations, such as C-Linda.

Methods of an Exemplary Embodiment of the Invention

The previous sections have described the structure and operation of various exemplary embodiments of the invention. In this section, the particular methods performed by such exemplary embodiments are described by reference to a series of flowcharts. These methods constitute computer programs made up of computer-executable instructions. Describing the methods by reference to flowcharts enables one skilled in the art to develop such programs including such instructions to carry out the methods on suitable computing systems (the processor of the computing systems executing the instructions from computer-readable media).

Figure 8:
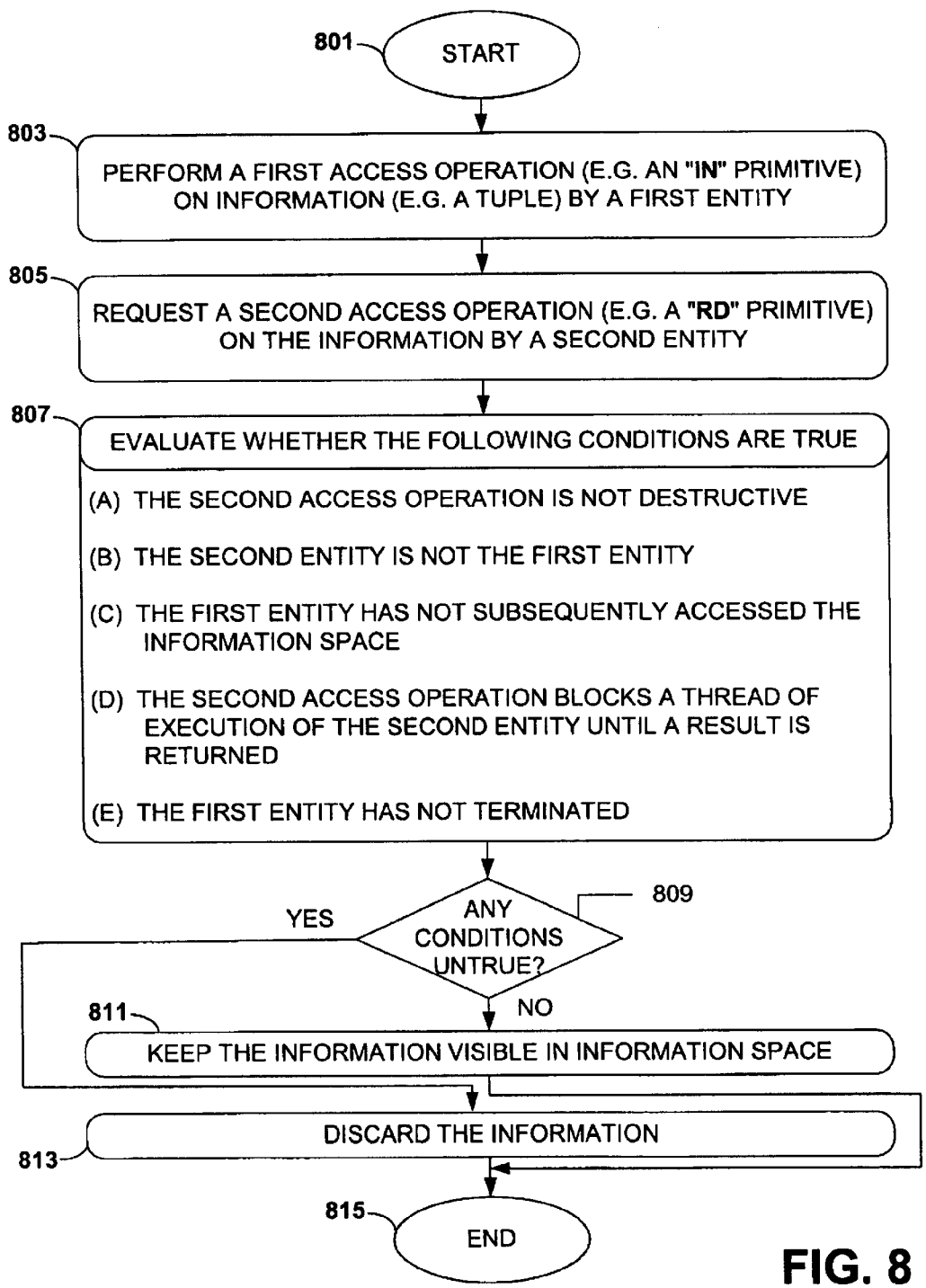
FIG. 8 is a flowchart of a method to be performed by an optimization of a tuple space based coordination language, according to an exemplary embodiment of the invention.

FIG. 8 is a flowchart of a method to be performed by an optimization of a tuple space based coordination language, according to an exemplary embodiment of the invention. It will be understood by one of ordinary skill that the steps depicted in this flowchart need not necessarily be performed in the order shown. It will also be understood that while the flowchart has "Start" and "End" blocks, in general the process it depicts is continuously performed.

The process begins with block 801. In block 803 a first access operation, such as an in primitive, is performed on information (e.g. a tuple in tuple space) by a first entity, such as an agent.

In block 805 a second access operation, such as a rd primitive, is requested to be performed on the information by a second entity.

In block 807 an evaluation is performed as to whether the following conditions are true:

(a) performance of the second access operation would not be destructive.

(b) the second entity is not the first entity.

(c) the first entity has not subsequently accessed the information space.

(d) the second access operation blocks a thread of execution of the second entity until a result is returned.

(e) the first entity has not terminated.

In decision block 809 a determination is made whether any of the conditions are untrue. If so, the method proceeds to block 813, wherein the information is discarded; otherwise, it proceeds to block 811, wherein the information is kept visible in information space to at least the second entity. The method ends in block 815.

If the method is being used in a closed system, wherein it is known whether deadlock is being used or not, as mentioned earlier Rule C above can be modified via the use of a run-time switch that, if enabled, substitutes the following modified Rule C1 for Rule C: the first entity has not subsequently inserted a tuple into the tuple space or caused any tuples to be inserted into the tuple space. By employing this modification to the rules, a performance improvement would be gained, because an in could be followed by an arbitrary number of rd primitives executed by the same entity (on tuples other than the tuple specified by the in), whereas in the case of unmodified Rule C once an entity has accessed tuple space (e.g. via a rd subsequent to an initial in), the tuple that was specified by the in must be discarded.

Alternatively, the method could be used with an open system, provided that a suitable advisory is issued to the system developers and users concerning the need to avoid the use of deadlock in the system and the potential consequences if deadlock is used.

Data Structure of an Exemplary Embodiment of the Invention

FIG. 9 is a diagram of a data structure 900 for use in an exemplary implementation of the invention. Data structure 900 occupies a portion of system memory 22 and is represented diagrammatically as comprising a plurality of data structure members 901–906. Each data structure member 901–906 stores data in a plurality of fields or other organizational units. The data contents for each data structure member 901–906 are provided in FIG. 9 under the column heading "Contents". The numbering and partitioning of the data structure members 901–906 in the column heading "Data Structure" is arbitrary, and it will be understood that more or fewer data structure members 901–906 can be provided. The particular organization of data structure members 901–906 within data structure 900 is a matter of design choice. For example, another implementation of data structure 900 can be organized more closely in accordance with how data is displayed in the screen print shown in FIG. 6.

Data structure member 901 comprises a plurality of tuples, for example as a list of tuples.

Data structure member 902 comprises a list of primitives performed on the plurality of tuples stored in data structure 901. The association of primitives with tuples can be similar to that shown in window 602 of FIG. 6, although it will be understood that the list of primitives and list of tuples can be separately stored and linked through an appropriate linkage structure.

Data structure member 903 stores for each primitive an identifier for an entity that performed that primitive. This association can be seen, for example, in line 612 of FIG. 6, wherein an entity "Thread-2:DemoTest:3" is linked with an out primitive, indicating that this particular entity performed this out primitive.

Data structure member 904 stores a count for each entity. The count is incremented whenever a predetermined type of primitive is performed by the entity. Considering again line 612 of FIG. 6, the "3" at the end of entity "Thread-2:DemoTest:3" represents a count of the number of times that the "Thread-2:DemoTest" entity has performed an out primitive.

Data structure member 905 stores a set of conditions under which a particular tuple can be kept visible to a second entity after a first entity has performed a primitive on the tuple. These conditions are the same as previously described, for example, regarding block 807 of FIG. 8.

Data structure member 906 stores a run-time switch that, if enabled, substitutes a modification of Rule C, as previously described, that enables a more efficient implementation of an optimization algorithm in a closed system if it can safely be assumed that deadlock is not being employed.

Various methods and an example of a data structure of an exemplary embodiment of the invention have been described.

Conclusion

In the above description we have described various methods by which a run-time system can transparently optimize when tuples should be removed from a tuple space. The optimization allows tuples to remain partially visible to other agents after an agent has destructively removed a tuple (for example using an in). This optimization is transparent to the agents using the system, and it does not alter the semantics of access primitives. We have described an optimization algorithm using the Linda primitives as an example and then generalized it so to be able to work with other primitives. We then described how the algorithm is implemented, inexpensively and efficiently.

The optimization is useful, because often tuples are used as counters for controlling structures within the tuple space. In the prior art the counters had to be removed from the tuple space and then re-inserted. However, while the counters are removed other agents are unable to access the counters. Several approaches have been proposed in the past, which involved the addition of new primitives or compile time analysis. However, the method proposed here is transparent and does not require compile time analysis.

A foundation for why the optimization works has been laid, by using a per agent trace of the primitives being performed, and by analyzing what the agent can deduce about the state of other agents. By knowing what the agent can deduce, we can decide when tuples that are destructively removed from a tuple space should really be removed.

One motivation for the present invention was to reduce the number of rd primitives that have to block, particularly when tuples are being used as shared counters as in the example in FIG. 1. An optimization algorithm, in accordance with one embodiment, provides a significant performance increase for a run-time system using it.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

Therefore, it is manifestly intended that this invention be limited only by the following claims and equivalents thereof.

What is claimed is:

1. A method of managing information in information space, the method comprising:
   performing a first access operation on the information by a first entity; and
   keeping the information in information space for a second access operation by a second entity, provided that the following conditions are true:
   (a) the second access operation is not destructive;
   (b) the second entity is not the first entity;
   (c) the first entity has not subsequently accessed the information space;
   (d) the second access operation blocks a thread of execution of the second entity until a result is returned; and,
   (e) the first entity has not terminated.

2. The method recited in claim 1 and further comprising:
   discarding the information if any of the conditions is untrue.

3. The method recited in claim 1, wherein the information is a tuple, and information space is tuple space.

4. The method recited in claim 1, wherein the first and second access operations are primitives.

5. The method recited in claim 1, wherein the first access operation is an in primitive, and the second access operation is a rd primitive.

6. The method recited in claim 5, wherein the information is a tuple functioning as a counter.

7. The method recited in claim 1, wherein the first and second entities are agents.

8. The method recited in claim 1, wherein in condition (d) a result comprises a tuple or an indication of completion of movement of tuples.

9. A computer-readable medium having computer-executable instructions for performing the steps recited in claim 1.

10. A method of managing tuple space, the method comprising:
    performing a first primitive on a tuple by a first entity; and
    keeping the tuple in tuple space for the performance of a second primitive by a second entity, provided that the following conditions are true:
    (a) the second primitive is not destructive;
    (b) The second primitive is not being performed by the same entity that performed the first primitive;
    (c) The first entity has not subsequently accessed the tuple space;
    (d) The second primitive blocks a thread of execution of the second entity until a result is returned; and,
    (e) The first entity has not terminated.

11. The method recited in claim 10, and further comprising:
    discarding the tuple if any of the conditions is untrue.

12. The method recited in claim 10, wherein the first primitive is an in primitive, and the second primitive is a rd primitive.

13. The method recited in claim 12, wherein the tuple is a counter.

14. The method recited in claim 10, wherein the first and second entities are agents.

15. The method recited in claim 10, wherein in condition (d) a result comprises a tuple or an indication of completion of movement of tuples.

16. A computer-readable medium having computer-executable instructions for performing the steps recited in claim 10.

17. A computer system to manage information in information space comprising:
    at least one processor to execute instructions;
    a memory to store the information and instructions, wherein the instructions comprise at least one instruction for performing a first access operation on the information, and at least one additional instruction for performing a second access operation on the information, the performance of the at least one additional instruction being subject to the following conditions being true:
    (a) the second access operation would not be destructive;
    (b) the at least one instruction and the at least one additional instruction would not be executed on behalf of an identical entity;
    (c) an entity requesting execution of the at least one instruction has not subsequently accessed the information space;
    (d) the second access operation blocks a thread of execution of which the at least one additional instruction is a part until a result is returned; and,
    (e) an entity requesting execution of the at least one instruction has not terminated.

18. The computer system recited in claim 17 wherein the instructions further comprise an instruction for discarding the information if any of the conditions is untrue.

19. The computer system recited in claim 17, wherein the information is a tuple, and the information space is tuple space.

20. The computer system recited in claim 17, wherein the at least one instruction and the at least one additional instruction are primitives.

21. The computer system recited in claim 17, wherein the at least one instruction is an in primitive, and the at least one additional instruction is a rd primitive.

22. The computer system recited in claim 21, wherein the information is a tuple functioning as a counter.

23. The computer system recited in claim 21, wherein the at least one instruction and the at least one additional instruction are to be executed on behalf of respective first and second agents.

24. The computer system recited in claim 21, wherein in condition (d) a result comprises a tuple or an indication of completion of movement of tuples.

25. The computer system recited in claim 17, wherein the instructions in the memory further comprise a run-time switch that, if enabled, substitutes the following condition for condition (c):
    (c1) an entity requesting execution of the at least one instruction has not subsequently inserted information into the information space or caused any information to be inserted into the information space.

26. A computer system to manage a tuple in tuple space comprising:
    at least one processor to execute instructions;
    a memory to store the tuple and instructions, wherein the instructions comprise at least one instruction for performing a first primitive on the tuple by a first entity, and at least one additional instruction for performing a second primitive on the tuple by a second entity, the performance of the second primitive being subject to the following conditions being true:

(a) performance of the second primitive would not be destructive;
(b) the second entity is different from the first entity;
(c) the first entity has not subsequently accessed the tuple space;
(d) The second primitive blocks a thread of execution of the second entity until a result is returned; and,
(e) the first entity has not terminated.

27. The computer system recited in claim 26, wherein the instructions further comprise an instruction for discarding the information if any of the conditions is untrue.

28. The computer system recited in claim 26, wherein the first primitive is an in primitive, and the second primitive is a rd primitive.

29. The computer system recited in claim 28, wherein the tuple is a counter.

30. The computer system recited in claim 26, wherein the entities are agents.

31. The computer system recited in claim 26, wherein in condition (d) a result comprises a tuple or an indication of completion of movement of tuples.

32. The computer system recited in claim 26, wherein the instructions in the memory further comprise a run-time switch that, if enabled, substitutes the following condition for condition (c):
  (c1) the first entity has not subsequently inserted a tuple into the tuple space or caused any tuples to be inserted into the tuple space.

33. A computer-readable medium having computer-executable components to cause a computer to perform a method of managing tuple space comprising:
  a first primitive to be performed on a tuple by a first entity;
  a second primitive to be performed on the tuple by a second entity; and
  a decision module to determine whether to keep the tuple in tuple space after the performance of the first primitive, the decision module keeping the tuple if the following conditions are true:
    (a) the second primitive is not destructive;
    (b) the second primitive is not being performed by the first entity;
    (c) the first entity has not subsequently accessed the tuple space;
    (d) the second primitive blocks a thread of execution of the second entity until a result is returned; and,
    (e) the first entity has not terminated.

34. The computer-readable medium recited in claim 33, wherein the decision module comprises at least one computer-executable instruction to discard the tuple if any of the conditions is untrue.

35. The computer-readable medium recited in claim 33, wherein the first primitive is an in primitive, and the second primitive is a rd primitive.

36. The computer-readable medium recited in claim 35, wherein the tuple is a counter.

37. The computer-readable medium recited in claim 35, wherein the first and second entities are agents.

38. The computer-readable medium recited in claim 33, wherein in condition (d) a result comprises a tuple or an indication of completion of movement of tuples.

39. The computer-readable medium recited in claim 33 and further comprising:
  a run-time switch that, if enabled, substitutes the following condition for condition (c):
    (c1) the first entity has not subsequently inserted a tuple into the tuple space or caused any tuples to be inserted into the tuple space.

40. A computer-readable medium having stored thereon a data structure comprising:
  a first data structure member that stores a plurality of tuples;
  a second data structure member that stores a list of primitives performed on the plurality of tuples;
  a third data structure member that stores for each primitive an identifier for an entity that performed the primitive;
  a fourth data structure member that stores a count for each entity, the count being incremented whenever a predetermined type of primitive is performed by the entity and,
  a fifth data structure member that stores a set of conditions under which a particular tuple can be kept visible to a second entity after a first entity has performed a primitive on the tuple.

41. The computer-readable medium recited in claim 40, wherein the predetermined type of primitive is an out or collect.

42. The computer-readable medium recited in claim 40, wherein the set of conditions comprises:
  (a) the second primitive is not destructive;
  (b) the second primitive is not being performed by the first entity;
  (c) the first entity has not subsequently accessed the tuple space;
  (d) the second primitive blocks a thread of execution of the second entity until a result is returned.

43. The computer-readable medium recited in claim 42 wherein the conditions additionally comprise:
  (e) the first entity has not terminated.

44. The computer-readable medium recited in claim 40, and further comprising:
  a sixth data structure member for storing a run-time switch that, if enabled, substitutes the following condition for condition (c):
    (c1) the first entity has not subsequently inserted a tuple into the tuple space or caused any tuples to be inserted into the tuple space.

* * * * *